US012718248B2

United States Patent
Gupta et al.

(10) Patent No.: US 12,718,248 B2
(45) Date of Patent: Aug. 25, 2026

(54) FRAUD DETECTION USING TIME-SERIES TRANSACTION DATA

(71) Applicant: American Express Travel Related Services Company, Inc., New York, NY (US)

(72) Inventors: Manish Gupta, Bangalore (IN); Avinash Tripathy, Gurgaon (IN); Adit Agrawal, Bangalore (IN); Madhan Rajasekkharan, Bangalore (IN); Abhinav Jain, Noida (IN)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/760,398

(22) Filed: Jul. 1, 2024

(65) Prior Publication Data

US 2024/0354767 A1 Oct. 24, 2024

Related U.S. Application Data

(63) Continuation of application No. 17/379,016, filed on Jul. 19, 2021, now abandoned.

(51) Int. Cl.

| | |
|---|---|
| ***G06Q 20/40*** | (2012.01) |
| ***G06N 3/045*** | (2023.01) |
| ***G06N 3/10*** | (2006.01) |

(52) U.S. Cl.

CPC ......... *G06Q 20/4016* (2013.01); *G06N 3/045* (2023.01); *G06N 3/10* (2013.01)

(58) Field of Classification Search

CPC ....... G06Q 20/4016; G06N 3/045; G06N 3/10

See application file for complete search history.

(56) References Cited

U.S. PATENT DOCUMENTS

| | | | |
|---|---|---|---|
| 2019/0197547 | A1 | 6/2019 | Garg |
| 2019/0377819 | A1 | 12/2019 | Filliben |
| 2019/0378010 | A1 | 12/2019 | Morris |
| 2019/0378051 | A1 | 12/2019 | Widmann |
| 2019/0385170 | A1 | 12/2019 | Arrabothu |
| 2022/0237620 | A1 | 7/2022 | Saarenvirta |
| 2022/0414662 | A1 | 12/2022 | Cao |

*Primary Examiner* — Lindsay M Maguire

(74) *Attorney, Agent, or Firm* — Thomas | Horstemeyer, LLP

(57) ABSTRACT

Disclosed are various embodiments for leveraging deep learning-based recurrent neural networks (RNNs) using time-series data to evaluate fraud risk for an incoming transaction associated with a user account. Time-series attributes can be extracted from historical transaction data and the incoming transaction data. The time-series attributes can be defined as an array of sequential events that are inputted into an RNN-based machine-learning framework to predict whether an incoming or otherwise pending transaction is fraudulent given the spending sequence. An RNN-based time-series prediction model can be trained to understand and predict patterns associated with a user's spending history according to the inputted time-series data in order to predict whether the transaction is fraudulent.

20 Claims, 5 Drawing Sheets

| Trans_Dt | Time | Amount | Indusamt | Time_Dates |
|---|---|---|---|---|
| 24MAY2017 | 3:01Hrs | 14.99 | 3640.3640.3611.5617.3977 | 69.98.97.65.31 |
| 07JUN2017 | 11:08Hrs | 2960.20 | 3640.3611.5617.3977.7416 | 112.111.79.45.61 |

FRAUD DETECTION USING TIME-SERIES TRANSACTION DATA

CROSS REFERENCE TO RELATED APPLICATIONS

This application is a continuation of, and claims priority to and the benefit of, U.S. patent application Ser. No. 17/379,016, filed on Jul. 19, 2021, the complete disclosure of which is incorporated herein by reference in its entirety.

BACKGROUND

Machine-learning is a technology that is becoming increasingly ubiquitous. For example, companies are often deploying machine-learning models to address problems in system availability, customer marketing, fraud detection and prevention, credit decisioning, etc. The ability of a machine-learning model to use the results of previous decisions to improve future decisions enables machine-learning models to deliver greater accuracy and predictability in their decisions over time.

Machine-learning models used for fraud detection are traditionally trained on snapshot data of a customer, standing at one time period to assess the probability that the incoming transaction is fraudulent. These models are well suited to learn from the aggregate profile of the customer. For example, the aggregate profile can be used to learn the riskiness of the merchant, mode of transaction, whether a transaction exceeds a minimum or maximum, etc., for fraud risk. Raw time-series data such as, for example, a customer spending history and a transaction history, can be meaningful in understanding a changing spend pattern of a customer which can be used to ascertain the likelihood of a transaction being fraudulent. However, the machine-learning models that are used for fraud detection are limited in their capabilities with respect to a longitudinal time-series view of the customer or a fraudster's spending behavior.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 depicts an example of the functionality of a fraud detection analyzer with respect to training the RNN prediction model according to various embodiments.

FIG. 5 depicts an example of the functionality of the fraud detection analyzer and an authorization service with respect to using time-series data to predict fraudulent transactions according to various embodiments.

FIG. 6 depicts an example of the functionality of the fraud detection analyzer with respect to generating features to apply to the RNN prediction model according to various embodiments.

DETAILED DESCRIPTION

Figure 1:
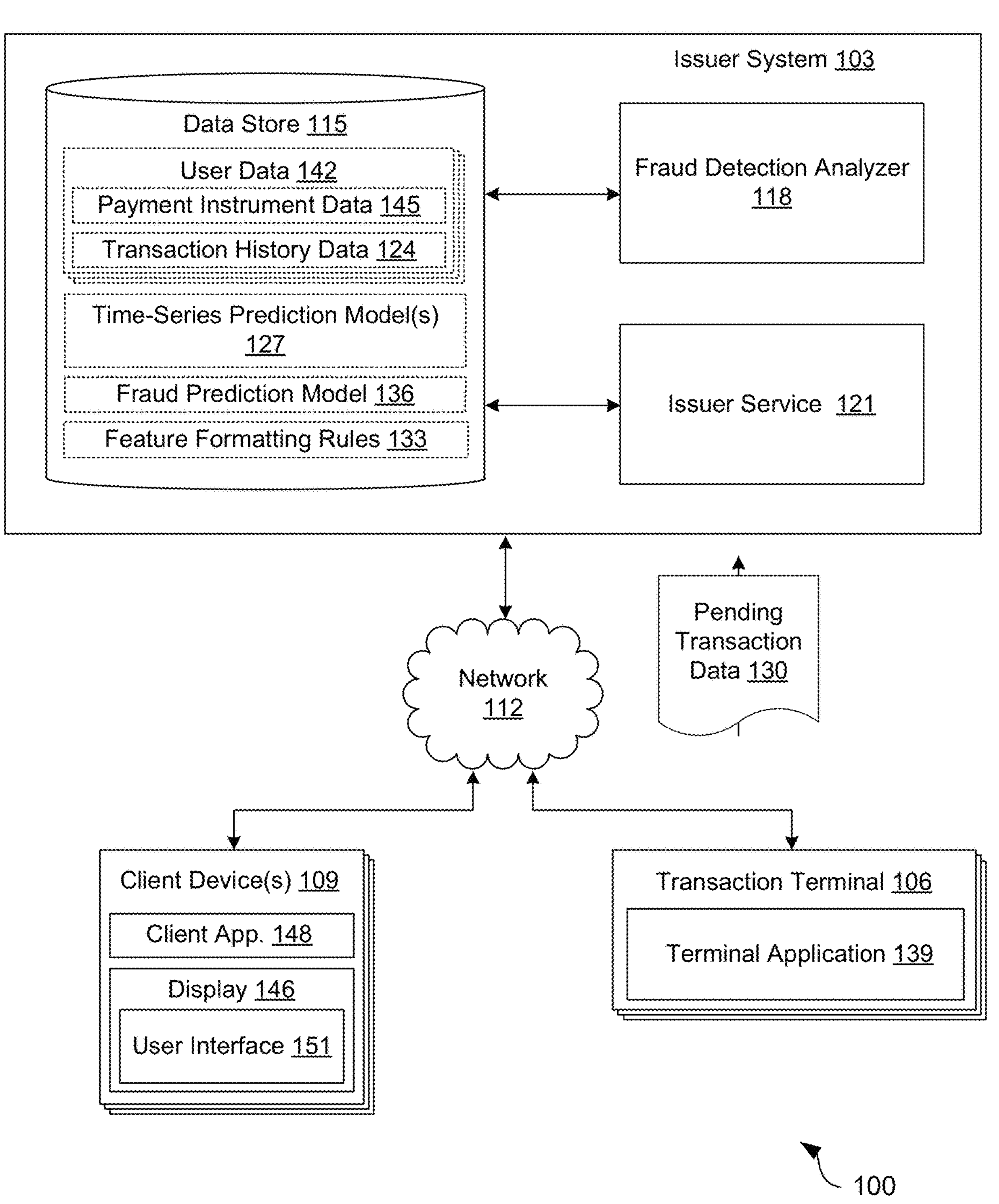
FIG. 1 is a drawing of a network environment according to various embodiments of the present disclosure.

Disclosed are various approaches for leveraging deep learning-based recurrent neural networks using time-series data to evaluate fraud risk for an incoming transaction associated with a user account. According to various embodiments, time-series attributes are extracted from transaction data associated with a threshold number of most-recent transactions (e.g., ten most recent transactions). The time-series attributes can be defined as an array of sequential events that are inputted into an RNN-based machine-learning framework to predict whether an incoming or otherwise pending transaction is fraudulent given the spending sequence. In particular, an RNN-based time-series prediction model is trained to understand and predict patterns associated with a user's spending history according to the time-series data associated with past transactions. By analyzing the attributes of the incoming transaction along with the attributes of the most recent transactions within a predefined threshold and predicting a pattern associated with the spending sequence, the time-series prediction model can detect whether a given transaction may be fraudulent.

RNNs understand sequences by applying the same mathematical function on every time step, hence the name "recurrent" neural network (RNN). There are mainly three (3) variants of RNNs which have been developed to understand sequences of varying complexities and lengths. The variants include simple RNN, GRU (Gated Recurrent Units), and LSTM (Long Short-Term Memory). According to various embodiments, the RNN prediction-based framework of the present disclosure uses LSTM for predicting fraudulent transaction data. LSTM-based RNNs are designed to remember more complex longer sequences. LSTM-based RNNs introduce various gates which control the input and flow of information throughout the network. When compared with some GRU-based RNNs, experimental results indicate that the LSTM-based RNNs provide better standalone variable discrimination power for generating the time-series prediction score (e.g., output of model) as well as better overall performance when the time-series prediction score is combined with a gradient-boosted fraud prediction model.

According to various examples, the time-series attributes obtained from a history of transactions and used to create arrays of sequential events (e.g., time-series features) can include, for example, industry identification data associated with the transaction (e.g., fast food restaurant, hotel, online purchase, airline, etc.), a transaction amount, a time of transaction, a date of transaction, a mode of transaction authentication, a mode of transaction, transaction location information, network connectivity data, device data, user account data, and/or other attributes that can be used to determine whether a transaction is in sync with prior behavior. The attributes can be used to generate time-series features which are analyzed by a trained time-series prediction model to detect changes in patterns observed in a series of transactions.

For example, assume that in the past N transactions, a user has initiated transactions for the purchase of items by inserting a chip of a payment instrument into a chip reader. However, data associated with the pending transaction can indicate that the user initiated the pending transaction by swiping the payment instrument instead of inserting the chip into a chip reader. According to various embodiments, this change in the pattern can be detected by the time-series prediction model and be used as a factor in determining whether the particular transaction is potentially fraudulent.

In various embodiments, the RNN prediction-based framework is implemented using graphics processing units (GPUs) (e.g., NVIDIA® GPUs) to improve processing-intensive operations associated with the time-series prediction model. For example, the RNN prediction-based framework can be implemented and deployed using GPU acceleration and optimization applications (e.g., Tensor RT®) that optimize inference leveraging libraries, development tools, and technologies for RNNs.

In various examples, the RNN prediction-based framework combines the time-series prediction model that can be created using RNNs with a gradient-boosted fraud prediction model that can be based on traditional machine-learning classification and regression techniques (e.g., decision trees). In particular, the output of the time-series prediction model can provide a probability as to whether a given transaction is fraudulent based on patterns observed in the raw time-series data. The output can be inputted as a feature to the gradient-boosted fraud prediction model which analyzes the snapshot of data along with the output from the time-series prediction model to determine whether the incoming or otherwise pending transaction is fraudulent. Accordingly, the analysis of the time-series data by the time-series prediction model can improve the fraud detection process by being able to identify anomalies in patterns of spending history by a customer.

One or more embodiments can be capable of achieving certain technical advantages, including some or all of the following: (1) reducing computer resource utilization (e.g., memory consumption, processor utilization, network transfer, etc.) by deploying an RNN prediction-based framework that utilizes graphics processing unit (GPU) acceleration to improve processing-intensive operations associated with the time-series prediction model; (2) improving latency (e.g., operates within two milliseconds) by utilizing GPUs to improve processing-intensive operations associated with the time-series prediction model; (3) minimizing false positive fraudulent predictions by analyzing raw real-time transaction data for a series of transactions; (4) improving the functioning of the computing system and reducing computer resource utilization (e.g., processor utilization) by formatting the time-series data into a simplified format; and so forth. In the following discussion, a general description of the system and its components is provided, followed by a discussion of the operation of the same.

With reference to FIG. 1, shown is a network environment 100 according to various embodiments. The network environment 100 includes an issuer system 103, one or more transaction terminals 106, and one or more client devices 109, which are in data communication with each other via a network 112. The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The issuer system 103 can comprise, for example, a server computer or any other system providing computing capability. Alternatively, the issuer system 103 can employ a plurality of computing devices that can be arranged, for example, in one or more server banks or computer banks or other arrangements. Such computing devices can be located in a single installation or may be distributed among many different geographical locations. For example, the issuer system 103 can include a plurality of computing devices that together can comprise a hosted computing resource, a grid computing resource, and/or any other distributed computing arrangement. In some cases, the issuer system 103 can correspond to an elastic computing resource where the allotted capacity of processing, network, storage, or other computing-related resources can vary over time. The computing devices of the issuer system 103 can comprise central processing units (CPUs) that provide general-purpose processing resources and graphics processing units (GPUs) that provide processing resources for deploying and executing the RNN models associated with the present disclosure. In various examples, the GPU resources can include Nvidia Tensor RT® platforms and/or other types of GPU-based platforms suitable for deep-learning applications.

Various applications and/or other functionality can be executed in the issuer system 103 according to various embodiments. Also, various data can be stored in a data store 115 that can be accessible to the issuer system 103. The data store 115 can be representative of a plurality of data stores 115 as can be appreciated. The data stored in the data store 115, for example, can be associated with the operation of the various applications and/or functional entities described below.

The components executed on the issuer system 103, for example, include a fraud detection analyzer 118, an issuer service 121, and other applications, services, processes, systems, engines, or functionality not discussed in detail herein. The fraud detection analyzer 118 can be executed to predict a likelihood of a fraudulent transaction according to various embodiments. In particular, the fraud detection analyzer 118 trains and uses machine-learning models to predict fraudulent transactions. According to various embodiments, the fraud detection analyzer 118 generates time-series features that include an array of sequences of time-series information extracted from transaction history data 124. The time-series features are used to train a time-series prediction model 127 to predict patterns in sequences corresponding to a spend history of a customer.

In addition, in response to identifying a pending transaction (e.g., authentication request), the fraud detection analyzer 118 obtains transaction history data 124 corresponding to a threshold number N (e.g., ten, twenty, one-hundred, etc.)

of recent transactions and generates time-series features comprising an array of sequences according to the time-series information extracted from the pending transaction data 130 of the pending transaction and the transaction history data 124 of the N most recent transactions. In various examples, the fraud detection analyzer 118 can generate the time-series features according to the feature formatting rules 133 such that the time-series data is a format that can be understood by and complies with the feature criteria of the time-series prediction model 127.

The fraud detection analyzer 118 applies the generated time-series features as inputs to the time-series prediction model 127, which can be trained to detect anomalies in predicted patterns according to the spend history defined by the time-series features. The fraud detection analyzer 118 further uses the output of the time-series series prediction model 127 and additional attribute data (e.g., aggregate profile data, pending transaction data 130, etc.) as inputs to a fraud prediction model 136 defined by regression or boosted decision tree algorithms. According to various examples, the fraud detection analyzer 118 can predict that a pending transaction is fraudulent when an output of the fraud prediction model 136 fails to meet or exceed a predefined threshold value.

The issuer service 121 can be executed to provision transaction terminals 106 to accept payments using payment instruments issued by the issuer service 121. The issuer service 121 can receive pending transaction data 130 for a given transaction from the terminal application 139. Using the pending transaction data 130 included in an authorization request, the issuer service 121 can confirm that funds or credit is available for a given payment instrument, such that the payment transaction is authorized to proceed or not authorized to proceed. Further, the issuer service 121 can perform its own risk analysis to determine whether to authorize or deny the payment transaction. For example, the issuer service 121 can invoke the fraud detection analyzer 118 to predict in real-time whether the pending transaction is fraudulent. Upon authorization of the transaction, the issuer service 121 can generate and send a transaction confirmation to the terminal application 139. If the transaction is predicted to be fraudulent, the issuer service 121 can send a notification to the terminal application 139 indicating that the transaction is denied.

The data stored in the data store 115 includes, for example, user data 142, machine-learning models including a time-series prediction model 127 and a fraud prediction model 136, feature formatting rules 133, and potentially other data. The user data 142 corresponds to information related to individuals who have been issued payment accounts by an issuer associated with the issuer system 103. A payment account can represent any financial account or agreement that a customer can use as a source of funds for payments. Payment accounts can include both credit accounts or facilities and financial deposit accounts that provide the owner with on demand access to funds stored in or associated with the payment account. In some instances, a payment account can allow a user to have frequent and/or immediate access to funds. In these instances, payment accounts can also be referred to as demand deposit accounts, which can be accessed in a variety of ways, such as the use of debit cards, checks, or electronic transfers (e.g., wire transfer, automated clearing house (ACH) transfer, etc.). Examples of payment accounts include charge or charge card accounts, credit or credit card accounts, checking accounts, savings accounts, money market accounts, demand accounts, deposit accounts, demand deposit accounts, etc.

The user data 142 can include payment instrument data 145, transaction history data 124, account address(es), account holder name, account holder contact information, authentication information, and/or other data associated with a user or user account provided by the issuer. The payment instrument data 145 can correspond to data associated with payment accounts provided by an issuer associated with of the issuer system 103. For example, the payment instrument data 145 can comprise data describing credit card accounts, debit card accounts, virtual cards, charge card accounts, and/or other mechanisms for effecting a payment with respect to a transaction account provided by the issuer of the issuer system 103 and associated with the user of the client device 109 or the user interacting with a transaction terminal 106. For example, for a credit card account or a charge card account, the payment instrument data 145 can store a card number, a cardholder name, an expiration date, a verification code, a billing address, and/or other information needed to consummate a payment.

The transaction history data 124 includes transaction data associated with prior transactions associated with a particular payment account. The transaction history data 124 can include a transaction amount, a transaction merchant, industry identification data associated with the transaction (e.g., fast food restaurant, hotel, online purchase, airline, etc.), a time of transaction, a date of transaction, a mode of transaction authentication, a mode of transaction, transaction location information, network connectivity data, device data, user account data, and/or other attributes that can be used to determine whether the transaction is in sync with prior behavior.

The machine learning models can represent different computer-implemented models for classifying and identifying data. In particular, the time-series prediction model 127 comprises a recurrent neural network (RNN) that identifies patterns in raw time-series data and detects anomalies associated with unexpected observations in one or more sequences associated with a spend history of a user account holder. According to various embodiments, the time-series prediction model 127 can be generated based at least in part on one or more machine learning algorithms as applied to one or more training sets and/or reference data sets (e.g., data sets of reference publications, reference paragraphs, reference social media posts, etc.). According to various embodiments, the machine learning algorithms are based on RNNs and include, for example, Long Short-Term Memory (LSTM).

Based on the RNN algorithms and architecture, the time-series prediction model 127 can be trained to understand sequences of raw time-series data corresponding to a history of transactions. According to various examples, the time-series information obtained from a history of transactions and used to create arrays of sequential events (e.g., time-series features) can include, for example, industry identification data associated with the transaction (e.g., fast food restaurant, hotel, online purchase, airline, etc.), a transaction amount, a time of transaction, a date of transaction, a mode of transaction authentication, a mode of transaction, transaction location information, network connectivity data, device data, user account data, and/or other attributes that can be used to determine a transaction is in sync with prior behavior.

The fraud prediction model 136 applies regression and classification techniques to generate a score based on a predicted likelihood that a pending transaction is fraudulent. According to various examples, the fraud prediction model 136 can be trained to learn from an aggregate profile of the customer (e.g., riskiness of the merchant, mode of transaction, average range of transaction amount, etc.) to predict a likelihood that the pending transaction is fraudulent. According to various examples, inputs of the fraud prediction model 136 include attribute data associated with the pending transaction, aggregate profile data, an output of the time-series prediction model 127, and/or other types of features.

According to various embodiments, the fraud prediction model 136 can be implemented through supervised ensemble machine learning techniques, for example, without limitation, as a gradient boosting machine learning model, or an extreme gradient boosting machine learning model. Gradient boosting models give a weight to each observation and change the weight after the training of a classifier. The weight to the wrongly classified observation can be increased and the weight to the correctly classified observation can be reduced. The observations whose weights have been modified are used to train a subsequent classifier. A gradient boosting model is a sequential ensemble modeling technique that can be implemented in a step-by-step method by focusing on the gradient reduction of a loss function in previous models. The loss function can be interpreted as the degree of error by the model. In general, the greater the loss function, the more likely the model will miss. As the purpose is to minimize the loss function and the error rate, a useful technique is to bring the loss function to decline in the gradient direction.

In various embodiments, the fraud prediction model 136 can be implemented as a gradient boosting decision tree (GBDT). A GBDT is an iterative model process for decision trees. A regression tree and a gradient boosting model can be combined into decision trees, with a predefined trimming. Multiple decision trees are built in the training process, with each tree gradient down by learning from the n-1 number of the tree. Finally, based on the aggregation of all the trees, weights can be produced to generate the final similarity score indicative of a latent similarity between records, such as a solution to the entity matching problem.

In some embodiments the fraud prediction model 136 can be implemented as an extreme gradient boosting tree (XGBoost). An XGBoost model can be an optimized version of a gradient boosting machine. The main improvement on GBDT is the normalization of the loss function to mitigate model variances. This also reduces the complexities of modeling and hence the likelihood of model over-fitness.

The XGBoost model supports linear classifiers, applicable not only to classifications but also to linear regressions. The traditional GBDT approach only deals with the first derivative in learning, but XGBoost improves the loss function with Taylor expansion. While the level of complexities increases for the learning of trees, the normalization prevents the problems associated with over-fitness. In a similar way to the implementation discussed above regarding GBDT, based on the aggregation of all the trees, weights can be produced to generate the final similarity score indicative of a latent similarity between records, such as a solution to the entity matching problem.

Although various implementations of the fraud prediction model 136 have been discussed with reference to gradient boosting decision trees and extreme gradient boosting decision trees, it is noted that the fraud prediction model 136 can be similarly implemented using other machine learning techniques including, but not limited to, logistic regression models, support vector machine models, random forest models, and other suitable machine learning modeling techniques.

The transaction terminal 106 can be representative of a plurality of computing devices that can be coupled to the network 112. The transaction terminal 106 can include a corresponding computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), a payment terminal, a point of sale (POS) system, or other devices with like capability.

Various applications or other functionality can be executed by the transaction terminal 106 according to various embodiments. The components executed on a transaction terminal 106 can include a terminal application 139 and other applications, services, processes, systems, engines, or functionality not discussed in detail herein.

The terminal application 139 can communicate with an issuer system 103 to conduct transactions with payment instruments associated with accounts of users or entities with an issuer. The terminal application 139 can also communicate with client devices 109 to conduct transactions with payment instruments that are presented to the terminal application 139 during the initiation of a transaction. The terminal application 139 can determine whether a particular transaction is approved or denied based upon information presented by a client device 109 and potentially other information, such as a transaction authorization obtained from the issuer system 103.

The client device 109 can be representative of a plurality of client devices that can be coupled to the network 112. The client device 109 can comprise, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 109 can include a display 146. The display 146 can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 109 can be configured to execute various applications such as a client application 148 and/or other applications. The client application 148 can be executed in a client device 109, for example, to access network content served up by the issuer system 103, the transaction terminal 106, and/or other servers, thereby rendering a user interface 151 on the display 146. To this end, the client application 148 can comprise, for example, a browser, a dedicated application, etc., and the user interface 151 may comprise a network page, an application screen, etc. The client device 109 can be configured to execute applications beyond the client application 148 such as, for example, email applications, social networking applications, word processors, spreadsheets, and/or other applications.

Figure 2:
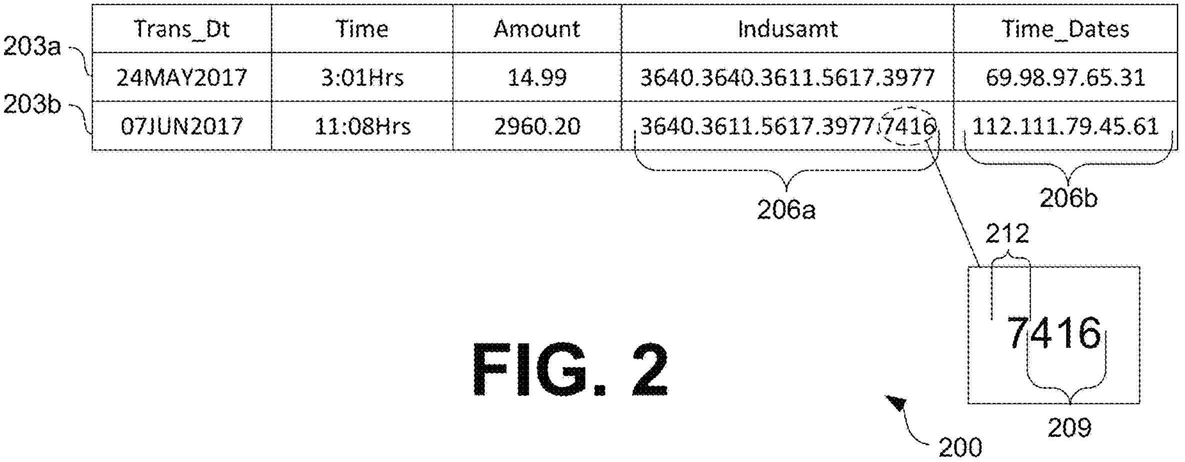
FIG. 2 is a table illustrating example interaction features associated with a history of transactions that can be applied as inputs to the recurrent neural network (RNN) prediction model of FIG. 1 according to various embodiments of the present disclosure.

Turning now to FIG. 2, shown is an example of time-series features 200 associated with various transactions 203 (e.g., 203*a*, 203*b*). The time-series features 200 of FIG. 2 include data associated with a given transaction 203 (e.g., amount of transaction, date of transaction, time of transaction, etc.) and a history of transactions (e.g., N most recent transactions). In the example of FIG. 2, the time-series features 200 can include a first type of interaction feature 206*a* and a second type of interaction feature 206*b* that both include arrays of sequential "events" associated with five (5) transactions.

The first type of interaction feature 206*a* combines an industry code 209 with an amount identifier 212 for each transaction 203 and contains a sequence associated with the combined attributes for each transaction 203. According to various examples, the amount identifier 212 can correspond to a predefined value that can be used to represent a range of amount values. For example, amounts that are within a first range (e.g., $1-$100) can be assigned a first value (e.g., "1") while amounts that are within a second range (e.g., $1000-$1500) can be assigned a second value (e.g., "2"). In the example of FIG. 2, the amount identifier 212 assigned the amount of $2960.20 associated with the transaction 203*b* can be represented by the value of "7." The time-series prediction model 127 can be trained to identify patterns associated with the various values associated with the combination of the industry code 209 and amount identifier 212 and detect anomalies associated with unexpected observations in the one or more sequences. In addition, by combining the industry code 209 with the amount identifier 212, the time-series prediction model 127 can be able to correlate an amount spent with an industry which can allow for detections of anomalies associated with the amount spent in a given industry (e.g., high spend in a new industry, high spend in a typically low spend industry, etc.).

The second type of interaction feature 206*b* corresponds to a sequence of numbers that represents a combination of a time of the day and days since the last transaction for each transaction. The second type of interaction feature 206*b* can provide recency and frequency information. In particular, the second type of interaction feature 206 corresponds to the recency and frequency for the current and previous N recent transactions. This type of time-series data can be useful to the time-series prediction model 127 to identify patterns associated with the recency and frequency between transactions 203 in order to detect anomalies associated with unexpected observations in the one or more sequences. The time-series prediction model 127 can be trained to identify patterns associated with the various values associated with the recency and frequency information associated with the second type of interaction feature 206*b*. Accordingly, the time-series prediction model 127 can be able to detect anomalies associated with the recency and frequency of transactions based on any patterns identified by the data included in the second type of interaction feature 206*b*.

It should be noted that although the example of FIG. 2 illustrates time-series features 200 associated with the amount of transaction, time of transaction, date of transaction, industry associated with the transaction, and recency/frequency information between transactions, the time-series prediction model 127 can be trained with any type of time-series data associated with the transactions, and is not limited to the type of time-series data discussed in the examples.

Figure 3:
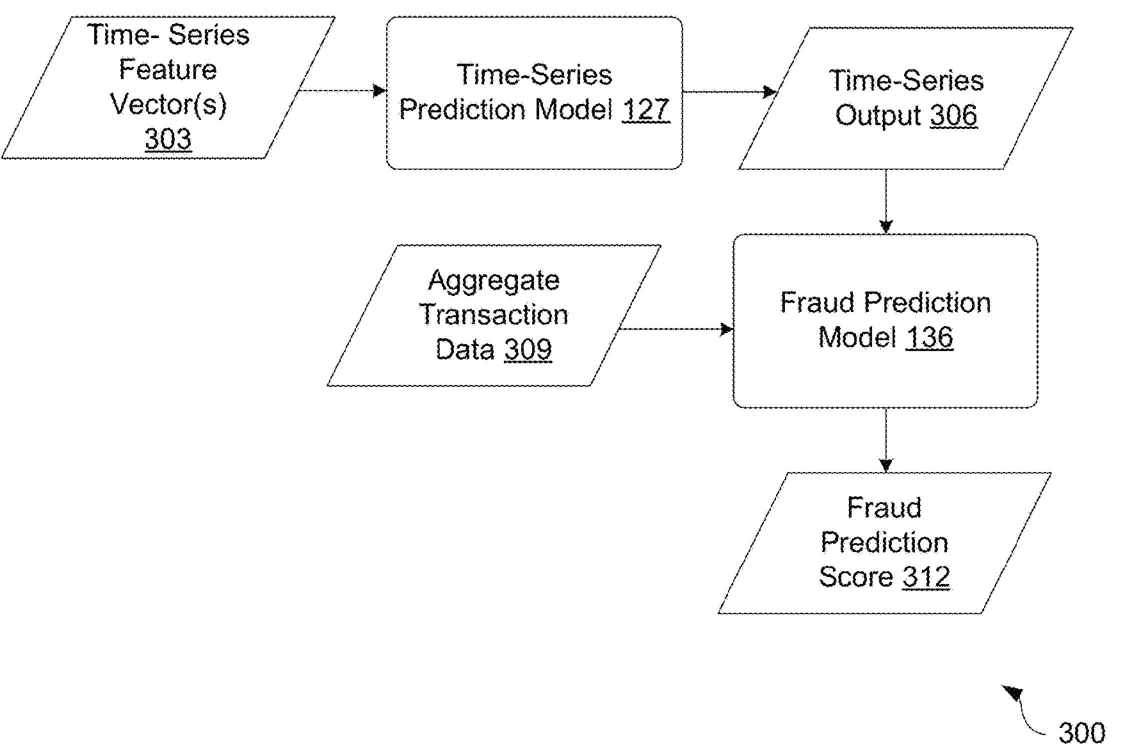
FIG. 3 is a flowchart illustrating a workflow associated with obtaining a fraud prediction score from the fraud prediction model of FIG. 1 according to various embodiments of the present disclosure.

Referring next to FIG. 3, shown is an example of a workflow 300 illustrating the RNN-based machine-learning framework of the present disclosure. In particular, FIG. 3 illustrates a workflow 300 to predict whether an incoming or otherwise pending transaction is fraudulent based on the time-series prediction model 127 and fraud prediction model 136. In the example of FIG. 3, time-series feature vectors 303 comprising time-series features 200 are generated using the pending transaction data 130 and transaction history data 124 associated with a threshold number of recent transactions 203. For example, in response to receiving an authorization request for a pending transaction from a transaction terminal 106 or a client device 109, the fraud detection analyzer 118 can obtain transaction history data 124 corresponding to a threshold number (N) of recent transactions associated with a payment account.

The fraud detection analyzer 118 can generate time-series features 200 that include sequences of data corresponding to attributes associated with the pending transaction and recent transaction. In various examples, the fraud detection analyzer 118 can extract various attributes from the pending transaction data 130 and transaction history data 124 and generate the time-series features 200 using the extracted attribute data. The attributes extracted from the pending transaction data 130 and transaction history data 124 can include industry identification data associated with the transaction (e.g., fast food restaurant, hotel, online purchase, airline, etc.), a transaction amount, a time of transaction, a date of transaction, a mode of transaction authentication, a mode of transaction, transaction location information, network connectivity data, device data, user account data, and/or other attributes that can be used to determine whether transactions are in sync with prior behavior.

According to various examples, the fraud detection analyzer 118 can generate time-series features 200 that include the first type of interaction feature 206*a* (e.g., sequences of industry code 209 combined with amount identifier 212) and the second type of interaction feature 206*b*. As discussed with regard to FIG. 2, the fraud detection analyzer 118 can combine an industry code 209 with an amount identifier 212 for each transaction 203 generate a sequence associated with the combined attributes for each transaction 203. Similarly, for the second type of interaction feature 206*b*, the fraud detection analyzer 118 can determine a value that represents a combination of a time of the day and days since the last transaction for each transaction and generate an array of values associated with the values for each of the prior transactions. In particular, the second type of interaction feature 206*b* can provide recency and frequency information associated with a series of transactions. Upon generating the various time-series features 200, the fraud detection analyzer 118 can generate time-series feature vectors 303 using the different time-series features 200 generated for a given transaction 203. In some examples, time-series feature vectors 303 that are associated with each the threshold number of recent transactions 203 can also be obtained from a data store and used as inputs to the time-series prediction model 127.

As shown in FIG. 3, the time-series feature vectors 303 associated with the pending transaction and/or threshold number of historical transactions 203 are used as inputs to the time-series prediction model 127. The time-series prediction model 127 comprises a recurrent neural network (RNN) that identifies patterns in raw time-series data and detects anomalies associated with unexpected observations in one or more sequences associated with a spend history of a user account holder. According to various embodiments, the time-series prediction model 127 can be based at least in part on Long Short-Term Memory (LSTM). Based on the RNN algorithms and architecture, the time-series prediction model 127 can be trained to understand sequences of raw time-series data corresponding to a history of transactions that are defined in the time-series feature vectors 303 that are provided as inputs to the time-series prediction model 127.

The time-series prediction model 127 can be designed to generate a time-series output 306 that represents a likelihood that the pending transaction is fraudulent in response to an analysis of the time-series data that can be included in the time-series feature vectors 303. In particular, the time-series prediction model 127 identifies patterns in raw time-series data and detects anomalies associated with unexpected observations in one or more sequences associated with a spend history of a user account holder. Based on the analysis of the time-series features 200 and whether any change in pattern is detected, the time-series prediction model 127 outputs a time-series output 306 that represents a likelihood of a fraudulent transaction.

Next, the fraud detection analyzer 118 can use the time-series output 306 generated by the time-series prediction model 127 as an input into a fraud prediction model 136. The fraud prediction model 136 applies regression and classification techniques to generate a score based on a predicted likelihood that a pending transaction is fraudulent. According to various examples, the fraud prediction model 136 can be trained to learn from an aggregate profile of the customer (e.g., riskiness of the merchant, mode of transaction, average range of transaction amount, etc.) to predict a likelihood that the pending transaction is fraudulent. According to various examples, inputs of the fraud prediction model 136 include attribute data associated with the pending transaction, aggregate transaction data 309, an output of the time-series prediction model 127, and/or other types of features.

According to various examples, the aggregate transaction data 309 can correspond to an aggregation of the transaction data associated with the transaction history data 124. For example, the aggregate transaction data 309 can represent averages associated with various attribute values, such as, for example, average spend amount per transaction. In some examples, the aggregate transaction data 309 can correlate to attribute value ranges and can include minimums and maximums with or without a standard deviation value. Therefore, the attribute values obtained from the pending transaction data 130 can be compared with the aggregate transaction data 309 via the fraud prediction model 136 to predict a likelihood of a fraudulent transaction. According to various examples, the time-series output 306 can be another input applied to the fraud prediction model 136 to determine a likelihood of a fraudulent transaction. Upon analyzing the pending transaction data 130, the time-series output 306, and the aggregate transaction data 309, the fraud prediction model 136 can output a fraud prediction score 312. The fraud detection analyzer 118 can compare the fraud prediction score 312 with a predefined threshold value to determine whether the pending transaction is to be considered fraudulent. For example, if the fraud prediction score 312 fails to meet or exceed the predefined threshold value, the fraud detection analyzer 118 can determine that the pending transaction 203 is to be considered fraudulent. In various examples, the issuer service 121 can authorize or deny the pending transaction 203 based at least in part on the value of the fraud prediction score 312.

Figure 4:
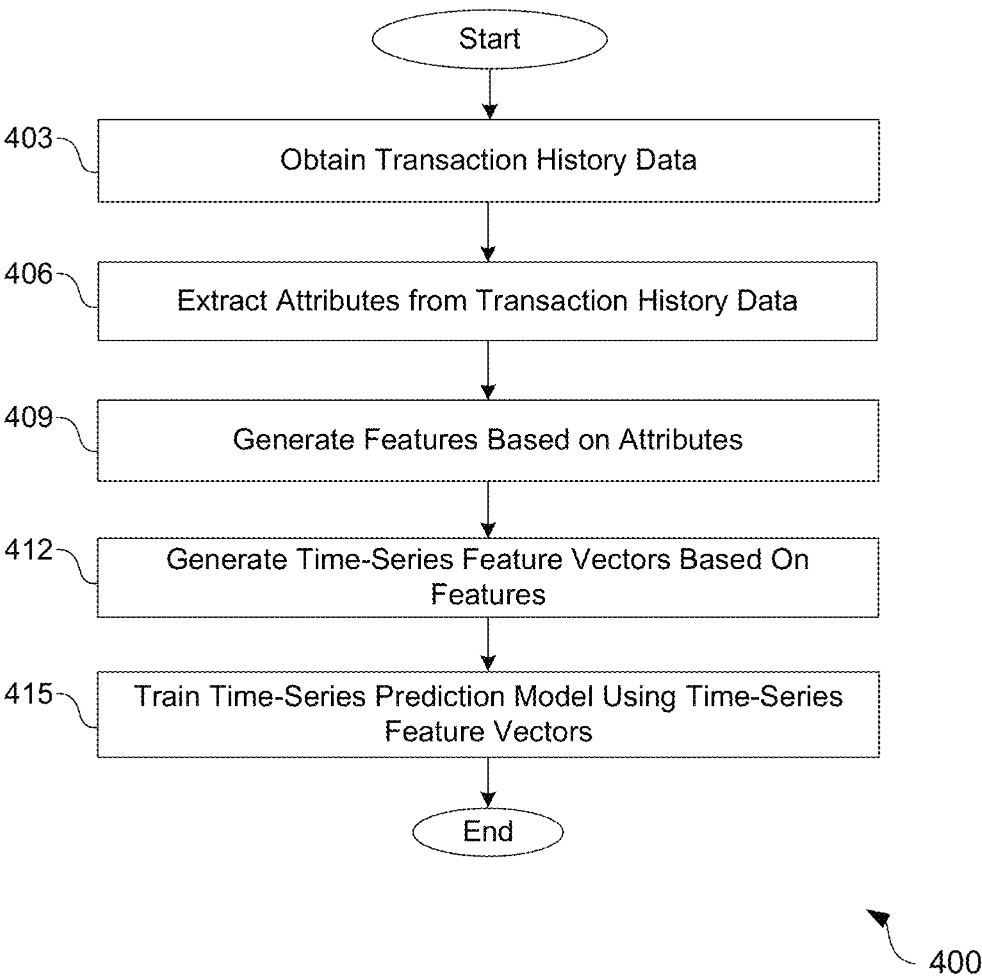
FIG. 4 is a flowchart illustrating an example of functionality implemented as a portion of the network environment of FIG. 2 according to various embodiments of the present disclosure. In particular.

Moving on to FIG. 4, shown is a flowchart 400 that provides one example of the operation of a portion of the fraud detection analyzer 118. It is understood that the flowchart of FIG. 4 provides merely an example of the many different types of functional arrangements that can be employed to implement the operation of the depicted portion of the fraud detection analyzer 118. As an alternative, the flowchart of FIG. 4 can be viewed as depicting an example of elements of a method implemented within the network environment 100.

FIG. 4 provides a non-limiting example of the functionality that can be performed by the fraud detection analyzer 118 with respect to training the time-series prediction model 127 according to various embodiments. For example, FIG. 4 relates to obtaining the transaction history data 124 associated with a subset of transactions 203 of payment accounts provided by an issuer of the issuer system 103. Time-series feature vectors 303 are trained using raw time-series attribute data extracted from the transaction history data 124 and the time-series prediction model 127 can be trained to identify patterns in the time-series data in order to determine a likelihood that a given transaction 203 is fraudulent.

Beginning with block 403, the fraud detection analyzer 118 can obtain transaction history data 124 associated with user data 142. The fraud detection analyzer 118 can obtain transaction history data 124 corresponding to a threshold number of transactions 203 associated with payment accounts issued by the issuer of the issuer system 103. In some examples, the transaction history data 124 corresponds to a same payment account. In other examples, the transaction history data 124 corresponds to multiple payment accounts associated with the issuer system 103. The transaction history data 124 can be selected randomly, according to a recency (e.g., within the last thirty days), according to a type of payment account, and/or other factors.

At block 406, for each transaction 203, the fraud detection analyzer 118 can parse through the corresponding transaction history data and extract attributes that can be used to generate time-series features 200 and time-series feature vectors 303 that are used to train the time-series prediction model 127. The extracted attributes can include, for example, industry identification data associated with the transaction (e.g., fast food restaurant, hotel, online purchase, airline, etc.), a transaction amount, a time of transaction, a date of transaction, a mode of transaction authentication, a mode of transaction, transaction location information, network connectivity data, device data, user account data, and/or other attributes that can be used to determine whether transactions are in sync with prior behavior.

At block 409, the fraud detection analyzer 118 generates the time-series features 200 using the extracted raw attributes from the transaction history data 124. In some examples, the fraud detection analyzer 118 can generate time-series features 200 by combining one or more attributes. For example, the time-series features 200 can include a first type of interaction feature 206*a* (FIG. 2) and/or a second type of interaction feature 206*b* (FIG. 2). To generate the first type of interaction feature 206*a*, the fraud detection analyzer 118 can combine an industry code 209 (FIG. 2) with an amount identifier 212 (FIG. 2) of the transaction 203 to generate a sequence associated with the combined attributes for a threshold level of prior transactions 203 (e.g., ten). To generate the second type of interaction feature 206*b*, the fraud detection analyzer 118 can determine a value that represents a combination of a time of the day and days since the last transaction for each transaction and generate an array of values associated with the values for each of the prior transactions. In particular, the second type of interaction feature 206*b* can provide recency and frequency information associated with a series of transactions. Other time-series features 200 for a given transaction can correspond to the attribute data extracted from the transaction history data 124.

At block 412, the fraud detection analyzer 118 can generate time-series feature vectors 303 (FIG. 3) using the different time-series features 200 generated for each transaction 203. For example, each time-series feature vector 303 can include one or more time-series features 200 associated with a transaction 203. The time-series feature vectors 303 can be used to train the time-series prediction model 127 to identify patterns in sequence data included in the time-series features 200 and detect any anomalies associated with changes in patterns that can correspond to fraudulent behavior.

At block 415, the fraud detection analyzer 118 can train the time-series prediction model 127 using the time-series feature vectors 303. According to various embodiments, the time-series prediction model 127 can be generated based at least in part on one or more machine learning algorithms as applied to one or more training sets and/or reference data sets (e.g., data sets of reference publications, reference paragraphs, reference social media posts, etc.). According to various embodiments, the machine learning algorithms are based on RNNs and include, for example, Long Short-Term Memory (LSTM).

The mathematics behind LSTM can be understood by understanding the following architectural components of an LSTM algorithm:

1. Input gate—The logic gate that controls what new information from any new time step gets incorporated into the network $$i_t = \sigma(W_i \cdot x_{(t)} + U_i h_{(t-1)} + b_i) \tag{1}$$

2. Forget gate—The logic gate that controls what past information gets forgotten from the network $$f_t = \sigma(W_f \cdot x_{(t)} + U_f h_{(t-1)} + b_f) \tag{2}$$

3. Output gate—The logic gate that controls what information gets outputted by the network ultimately at the end of any time step $$o_{(t)} = \sigma(W_o \cdot x_{(t)} + U_o h_{(t-1)} + b_o) \tag{3}$$

4. Cell state—Also called the memory state, this state stores the memory of the network $$g_{(t)} = \tanh(W_g \cdot x_{(t)} + Ug \cdot h_{(t-1)} + b_g) \tag{4}$$

$$c_{(t)} = f_{(t)} * c_{(t-1)} + i_{(t)} * g_{(t)} \tag{5}$$

5. Hidden state—This state is the final output at any time step of the network $$h_{(t)} = \tanh(c_{(t)}) * o_{(t)} \tag{6}$$

where

σ is sigmoid function, x→input vector of D dimension, h→hidden state of H dimension, $W \rightarrow R^{H \times d}$ where H is the dimension of hidden state and D is the dimension of input vectors, $U \rightarrow R^{H \times H}$ where H is the dimension of hidden state, and $B \rightarrow R^{H \times 1}$ where H is the dimension of hidden state.

Based on the RNN algorithms and architecture, the time-series prediction model 127 can be trained to understand sequences of raw time-series data corresponding to a history of transactions and defined by the time-series feature vectors 303. After the time-series prediction model 127 is created and trained, this portion of the process proceeds to completion.

Figure 5:
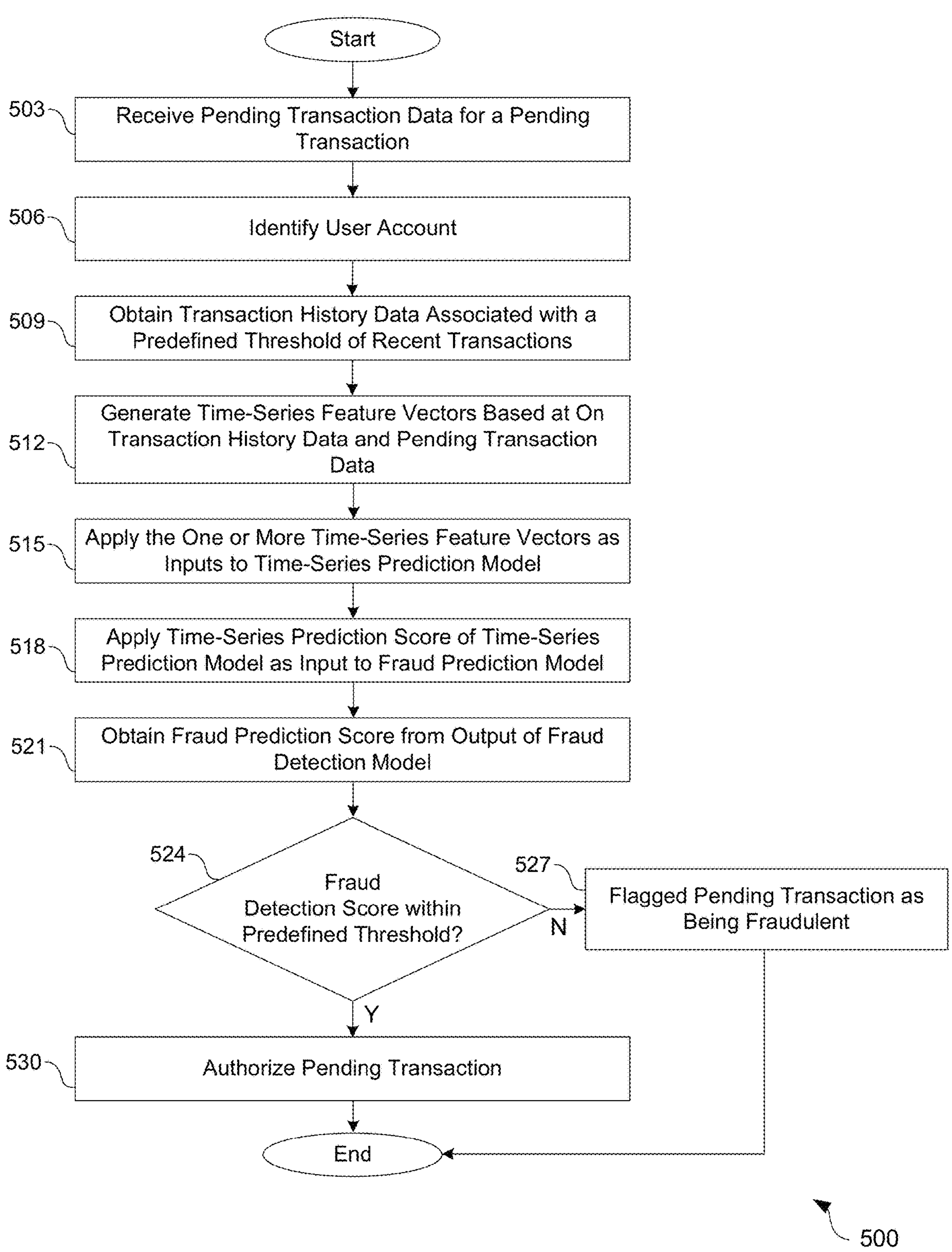
FIG. 5 is a flowchart illustrating an example of functionality implemented as a portion of the network environment of FIG. 2 according to various embodiments of the present disclosure. In particular.

Moving on to FIG. 5, shown is a flowchart 500 that provides one example of the operation of portions of the issuer service 121 and the fraud detection analyzer 118. It is understood that the flowchart 500 of FIG. 5 provides merely an example of the many different types of functional arrangements that can be employed to implement the operation of the depicted portions of the issuer service 121 and the fraud detection analyzer 118. As an alternative, the flowchart 500 of FIG. 5 can be viewed as depicting an example of elements of a method implemented within the network environment 100.

FIG. 5 provides a non-limiting example of the functionality that can be performed by the issuer service 121 and the fraud detection analyzer 118 with respect to applying the trained time-series prediction model 127 and the trained fraud prediction model 136 to determine a likelihood of fraud and authorizing or denying a transaction based on the determined likelihood. For example, FIG. 5 relates to obtaining the transaction history data 124 associated with a subset of transactions 203 for a payment account and generating time-series feature vectors 303 that are trained using raw time-series attribute data extracted from the transaction history data 124 and the pending transaction data 130 for a pending transaction 203. The issuer service 121 can authorize or deny the pending transaction 203 according to an output of the trained machine-learning models.

Beginning with block 503, the issuer service 121 can obtain pending transaction data 130 from a client device 109 or a transaction terminal 106. In various examples, the pending transaction data 130 can be included in a transaction authorization request associated with a pending transaction. For example, a user having a payment account associated with an issuer of the issuer system 103 can present a payment instrument associated with the payment account to the client application 148 and/or transaction terminal 106 to initiate a purchase of an item and/or service. In response, the transaction terminal 106 and/or client device 109 can transmit an authorization request including pending transaction data 130 to the issuer service 121 for authorization. The pending transaction data 130 can include details associated with the pending transaction such as, for example, a merchant name, a merchant industry, industry identification data associated with the transaction (e.g., fast food restaurant, hotel, online purchase, airline, etc.), a transaction amount, a time of transaction, a date of transaction, a mode of transaction authentication, a mode of transaction, transaction location information, network connectivity data, device data, user account data, and/or other attributes. In various examples, the issuer service 121 can send the pending transaction data 130 to the fraud detection analyzer 118 to determine a likelihood that the pending transaction is fraudulent.

At block 506, the fraud detection analyzer 118 can identify the payment account associated with the pending transaction data 130. For example, the pending transaction data 130 can include an account number, an account holder name, and/or other identifying features associated with the payment instrument data 145 that can be used to identify the payment account and corresponding user data 142.

At block 509, the fraud detection analyzer 118 can obtain transaction history data 124 associated with a predefined threshold of recent transactions 203 associated with the payment account. For example, assume that the predefined threshold is ten (10) transactions. In this example, the fraud detection analyzer 118 can obtain the transaction history data 124 associated with the ten most recent transactions 203. In some examples, the selection of transactions 203 can be based at least in part on a recency associated with the transactions 203 such as, for example, transactions occurring in the last N days, weeks, or months.

At block 512, the fraud detection analyzer 118 generates time-series feature vectors 303 based at least in part on the pending transaction data 130 and the transaction history data 124. For each transaction 203, the fraud detection analyzer 118 can parse through the corresponding transaction history data 124 and extract attributes that can be used to generate time-series features 200 that are used to generate the time-series feature vectors 303. The extracted attributes can include, for example, industry identification data associated with the transaction (e.g., fast food restaurant, hotel, online purchase, airline, etc.), a transaction amount, a time of transaction, a date of transaction, a mode of transaction authentication, a mode of transaction, transaction location information, network connectivity data, device data, user account data, and/or other attributes that can be used to determine whether transactions are in sync with prior behavior The fraud detection analyzer 118 can generate the time-series features 200 using the extracted raw attributes from the transaction history data 124. In some examples, the fraud detection analyzer 118 can generate time-series features 200 by combining one or more attributes. For example, the time-series features 200 can include a first type of interaction feature 206*a* (FIG. 2) and/or a second type of interaction feature 206*b* (FIG. 2). To generate the first type of interaction feature 206*a*, the fraud detection analyzer 118 can combine an industry code 209 (FIG. 2) with an amount identifier 212 (FIG. 2) of the transaction 203 to generate a sequence associated with the combined attributes for a threshold level of prior transactions 203 (e.g., 10). To generate the second type of interaction feature 206*b*, the fraud detection analyzer 118 can determine a value that represents a combination of a time of the day and days since the last transaction for each transaction and generate an array of values associated with the values for each of the prior transactions. In particular, the second type of interaction feature 206*b* can provide recency and frequency information associated with a series of transactions. Other time-series features 200 for a given transaction can correspond to the attribute data extracted from the transaction history data 124.

Once the time-series features 200 are generated, the fraud detection analyzer 118 can generate time-series feature vectors 303 (FIG. 3) using the different time-series features 200 generated for each transaction 203. For example, each time-series feature vector 303 can include one or more time-series features 200 associated with a transaction 203. It should be noted that in some examples, a time-series feature vector 303 for one or more transactions 203 can be previously generated and stored in the transaction history data 124. As such, the fraud detection analyzer 118 can use the stored time-series feature vector 303 for the given transaction 203 instead of generating a new time-series feature vector 303 for the transaction, thereby conserving computing resources.

At block 515, the fraud detection analyzer 118 applies the time-series feature vectors 303 as inputs to the time-series prediction model 127. As discussed, the time-series prediction model 127 comprises a recurrent neural network (RNN) that identifies patterns in raw time-series data and detects anomalies associated with unexpected observations in one or more sequences associated with a spend history of a user account holder. In particular, the time-series prediction model 127 can be trained to understand sequences of raw time-series data corresponding to a history of transactions that are defined in the time-series feature vectors 303 that are provided as inputs to the time-series prediction model 127. Based on the analysis of the time-series features 200 and whether any change in pattern is detected, the time-series prediction model 127 outputs a time-series output 306 that represents a likelihood of a fraudulent transaction.

At block 518, the fraud detection analyzer 118 can use the time-series output 306 generated by the time-series prediction model 127 as an input into a fraud prediction model 136. The fraud prediction model 136 applies regression and classification techniques to generate a score based on a predicted likelihood that a pending transaction is fraudulent. According to various examples, the fraud prediction model 136 can be trained to learn from an aggregate profile of the customer (e.g., riskiness of the merchant, mode of transaction, average range of transaction amount, etc.) to predict a likelihood that the pending transaction is fraudulent. According to various examples, inputs of the fraud prediction model 136 include attribute data associated with the pending transaction, aggregate transaction data 309, an output of the time-series prediction model 127, and/or other types of features. Upon analyzing the pending transaction data 130, the time-series output 306, and the aggregate transaction data 309, the fraud prediction model 136 outputs a fraud prediction score 312, which can be obtained by the fraud detection analyzer 118 at block 521.

At block 524, the fraud detection analyzer 118 can determine whether the fraud prediction score 312 meets or exceeds a predefined threshold. If the fraud prediction score 312 meets or exceeds the predefined threshold, the fraud detection analyzer 118 can notify the issuer service 121, and the process proceeds to block 530. Otherwise, the fraud detection analyzer 118 can notify the issuer service 121 that the fraud prediction score 312 fails to meet or exceed the predefined threshold, then the process proceeds to block 527.

At block 527, the issuer service 121 can flag the pending transaction 203 as being fraudulent. In some examples, flagging the pending transaction 203 as being fraudulent can cause the issuer service 121 to deny the pending transaction 203. In this example, the issuer service 121 can notify the transaction terminal 106 and/or the client device 109 that the pending transaction is denied. In other examples, flagging the pending transaction as being fraudulent can indicate that the pending transaction requires additional review (e.g., manual or automated) before the issuer service 121 can authorize and/or deny the pending transaction 203.

At block 530, the issuer service 121 can authorize the pending transaction 203. For example, the issuer service 121 can send a notification to the transaction terminal 106 and/or the client device 109 indicating that the pending transaction is authorized. Thereafter, this portion of the process proceeds to completion.

Figure 6:
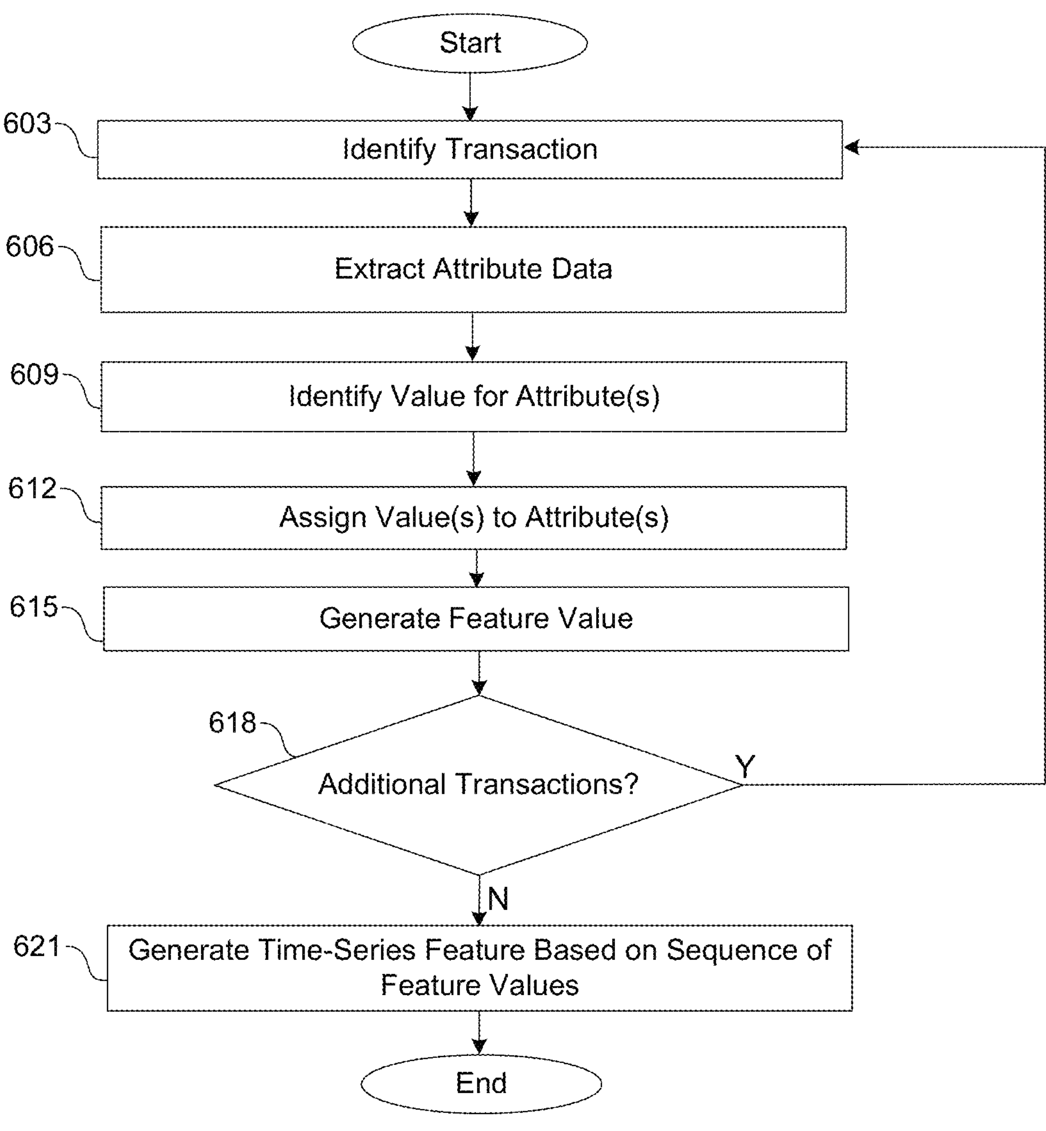
FIG. 6 is a flowchart illustrating an example of functionality implemented as a portion of the network environment of FIG. 2 according to various embodiments of the present disclosure. In particular.

Moving on to FIG. 6, shown is a flowchart 600 that provides one example of the operation of a portion of the fraud detection analyzer 118. It is understood that the flowchart 600 of FIG. 6 provides merely an example of the many different types of functional arrangements that can be employed to implement the operation of the depicted portion of the fraud detection analyzer. As an alternative, the flowchart 600 of FIG. 6 can be viewed as depicting an example of elements of a method implemented within the network environment 100.

FIG. 6 provides a non-limiting example of the functionality that can be performed by the fraud detection analyzer 118 with respect to generating time-series features 200 according to the transaction history data 124 and/or the pending transaction data 130. In particular, FIG. 6 illustrates an example of combining attributes extracted from the transaction history data 124 and/or the pending transaction data 130 to generate feature values and form time-series features 200 such as, for example, the first type of interaction feature 206*a* or the second type of interaction feature 206*b*.

At block 603, the fraud detection analyzer 118 identifies a transaction 203 associated with the transaction history data 124 and/or pending transaction data 130. For example, when generating time-series features 200, the fraud detection analyzer 118 can generate time-series features 200 that include an array of sequences of time-series information corresponding to a predefined threshold number of recent transactions 203 extracted from transaction history data 124 and/or pending transaction data 130. Therefore, the identified transaction 203 can correspond to the pending transaction 203 or one of the transactions 203 included in the predefined threshold number of recent transactions 203. For example, the identified transaction 203 can be identified based at least in part on recency relative to the date and/or time of the pending transactions 203.

At block 606, the fraud detection analyzer 118 extracts attribute data associated with the identified transaction 203. According to various examples, the attribute data can include details associated with the transaction 203 such as, for example, a merchant name, industry identification data associated with the transaction (e.g., fast food restaurant, hotel, online purchase, airline, etc.), a transaction amount, a time of transaction, a date of transaction, mode of transaction authentication, mode of transaction, transaction location information, network connectivity data, device data, user account data, and/or other attributes that can be used to determine whether the user associated with the transactions is making transaction which are in sync with prior behavior.

At block 609, the fraud detection analyzer 118 identifies a value for a given attribute based at least in part on the feature formatting rules 133. In some examples, the value of the attribute can correspond to the actual attribute value extracted from the transaction history data 124 or pending transaction data 130 and formatted in a format that can be defined by the feature formatting rules 133 (e.g., transaction date, transaction time, industry code 209, etc.). In other examples, the attribute value can be defined according to a range and/or a bucket that correspond to the attribute based at least in part on the feature formatting rules 133. For example, the first type of interaction feature 206*a* can include a combination of an amount identifier 212 and an industry code 209. In various examples, the amount identifier 212 corresponds to a value associated with a range that the transaction amount falls into. In particular, the attribute value for a transaction amount can be selected from a plurality of attribute values based on a range associated with the transaction amount as defined by the feature formatting rules 133. For example, amounts that are within a first range (e.g., $1-$100) can be assigned a first attribute value (e.g., "1") while amounts that are within a second range (e.g., $1000-$1500) can be assigned a second attribute value (e.g., "2"). As such, in this example, the fraud detection analyzer 118 can identify the value for the given attribute by mapping the transaction amount of the transaction 203 to the attribute value associated with the amount range corresponding to the transaction amount.

At block 612, the fraud detection analyzer 118 can assign the value to the given attribute. Using the example associated with block 612, the fraud detection analyzer 118 can assign the attribute value identified from the feature formatting rules 133 to the given attribute. The assigned value can be used to generate the time-series feature 200 for applying to the time-series prediction model 127. In the example of the transaction amount, the amount identifier 212 can correspond to the assigned value.

At block 615, the fraud detection analyzer 118 can generate the time-series feature value for the transaction 203. In some examples, the fraud detection analyzer 118 can determine whether one or more attributes are to be combined to create a time-series feature 200. For example, the time-series features 200 can include a first type of interaction feature 206*a* (FIG. 2) and/or a second type of interaction feature 206*b* (FIG. 2). To generate the first type of interaction feature 206*a*, the fraud detection analyzer 118 can combine an industry code 209 (FIG. 2) with an amount identifier 212 (FIG. 2) of the transaction 203 generate a sequence associated with the combined attributes for a threshold level of prior transactions 203 (e.g., 10). To generate the second type of interaction feature 206*b*, the fraud detection analyzer 118 can determine a value that represents a combination of a time of the day and/or days since the last transaction for each transaction and generate an array of values associated with the values for each of the prior transactions. In particular, the second type of interaction feature 206*b* can provide recency and frequency information associated with a series of transactions. Other time-series features 200 for a given transaction 203 can correspond to the attribute data extracted from the transaction history data 124 and are not be combined with other attributes.

In examples where the attribute values are to be combined, the fraud detection analyzer 118 can generate the feature value based on a particular format for combining the attribute values that can be defined by the feature formatting rules 133. In the example of the first type of interaction feature 206*a* where the industry code 209 can be combined with the amount identifier 212, the feature formatting rules 133 can define that the combine value corresponds to the amount identifier 212 followed by the industry code 209, as illustrated in FIG. 2. However, it should be noted, that the format for combining attributes can differ for different types of features. In examples where the time-series feature 200 is not based on a combination of attribute values, the feature value corresponds to the attribute value assigned in block 612.

At block 618, the fraud detection analyzer 118 determines if there are additional transactions for creating a given feature value. If there are additional transactions, the fraud detection analyzer 118 returns to block 603. Otherwise, the fraud detection analyzer 118 proceeds to block 621.

At block 621, the fraud detection analyzer 118 can generate a time-series feature 200 based on a sequence of the feature values. According to various examples, the time-series features 200 can include an array of sequences of time-series information (e.g., the feature values) corresponding to the predefined threshold number of recent transactions 203 extracted from transaction history data 124 and/or pending transaction data 130. For example, as illustrated in FIG. 2, the first type of interaction feature 206*a* includes a string of feature values (e.g., combination of industry code 209 and amount identifier 212) associated with the past five transactions. According to various embodiments, the generated time-series feature 200 can be applied as an input to the time-series prediction model 127 to identify patterns in spend history of a user and detect any anomalies in the pattern that can indicate fraudulent behavior. Thereafter, this portion of the process proceeds to completion.

A number of software components previously discussed are stored in the memory of the respective computing devices and are executable by the processor respective computing devices. In this respect, the term "executable" means a program file that can be in a form that can ultimately be run by the processor. Examples of executable programs can be a compiled program that can be translated into machine code in a format that can be loaded into a random access portion of the memory and run by the processor, source code that can be expressed in proper format such as object code that can be capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X and/or Y; X and/or Z; Y and/or Z; X, Y, and/or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

The invention claimed is:

1. A system, comprising:

at least one computing device comprising at least one processor and at least one memory; and machine-readable instructions stored in the at least one memory that, when executed by the at least one processor, cause the at least one computing device to at least:

obtain data (1) from a data store comprising (1)-historical transaction data and (2) from a terminal application comprising pending transaction data for a pending transaction associated with a user account;

reformat the data into a simplified format that complies with at least one feature criterion of a prediction model of a recurrent neural network prediction-based framework comprising at least one graphics processing unit (GPU), the data being reformatted by causing the at least one processor to at least:

extract a plurality of respective raw attributes from the data;

generate a plurality of interaction features comprising reformatted versions of the plurality of respective raw attributes associated with a pending transaction feature and at least one historical transaction feature; and generate a time-series feature vector comprising the plurality of interaction features, the time-series feature vector including an array of values corresponding to a predetermined number of sequential events;

apply the time-series feature vector as an input to the prediction model that is executed using the at least one GPU of the recurrent neural network prediction-based framework, the prediction model being trained to identify patterns in raw time-series data represented by the time-series feature vector; and authorize the pending transaction based at least in part on an output of the prediction model, wherein the output provides a probability that the pending transaction is fraudulent based at least in part on the data.

2. The system of claim 1, wherein reformatting the data further comprises generating a first interaction feature of the plurality of interaction features by combining a first respective raw attribute value of a first respective raw attribute of the plurality of respective raw attributes and a second respective raw attribute value of a second respective raw attribute of the plurality of respective raw attributes.

3. The system of claim 2, wherein the first respective raw attribute corresponds to a respective industry code associated with a respective transaction and the second respective raw attribute corresponds to a respective transaction amount associated with the respective transaction.

4. The system of claim 3, wherein, when executed, the machine-readable instructions further cause the at least one computing device to at least assign an amount identifier of a plurality of amount identifiers to the respective transaction amount based at least in part on a value of the respective transaction amount, and an individual amount identifier of the plurality of amount identifiers corresponding to a plurality of different transaction amount ranges.

5. The system of claim 1, wherein the prediction model comprises a first prediction model and a second prediction model, the first prediction model comprising a recurrent neural network (RNN) model.

6. The system of claim 1, wherein the plurality of respective raw attributes comprise at least one of industry identification data, a transaction amount, a transaction date, transaction location data, a transaction mode, an authentication mode, user account data, client device data, or network connectivity data.

7. The system of claim 1, wherein, when executed, the machine-readable instructions further cause the at least one processor to at least determine that a fraud prediction score is based at least in part on an output of the prediction model, the pending transaction being authorized based at least in part on fraud prediction score.

8. A method, comprising:

obtaining data (1) from a data store comprising historical transaction data and (2) from a terminal application comprising pending transaction data for a pending transaction associated with a user account;

reformatting the data into a simplified format that complies with at least one feature criterion of a prediction model of a recurrent neural network prediction-based framework comprising at least one graphics processing unit (GPU), the data being reformatted by:

extracting a plurality of respective raw attributes from the data;

generating a plurality of interaction features comprising reformatted versions of the plurality of respective raw attributes associated with a pending transaction feature and at least one historical transaction feature; and generating a time-series feature vector comprising the plurality of interaction features, the time-series feature vector including an array of values corresponding to a predetermined number of sequential events;

applying the time-series feature vector as an input to the prediction model that is executed using the at least one GPU of the recurrent neural network prediction-based framework, the prediction model being trained to identify patterns in raw time-series data represented by the time-series feature vector; and authorizing the pending transaction based at least in part on an output of the prediction model, wherein the output provides a probability that the pending transaction is fraudulent based at least in part on the data.

9. The method of claim 8, wherein reformatting the data further comprises generating a first interaction feature of the plurality of interaction features by combining a first respective raw attribute value of a first respective raw attribute of the plurality of respective raw attributes and a second respective raw attribute value of a second respective raw attribute of the plurality of respective raw attributes.

10. The method of claim 9, wherein the first respective raw attribute corresponds to a respective industry code associated with a respective transaction and the second respective raw attribute corresponds to a respective transaction amount associated with the respective transaction.

11. The method of claim 10, further comprising assigning an amount identifier of a plurality of amount identifiers to the respective transaction amount based at least in part on a value of the respective transaction amount, and an individual amount identifier of the plurality of amount identifiers corresponding to a plurality of different transaction amount ranges.

12. The method of claim 8, wherein the prediction model comprises a first prediction model and a second prediction model, the first prediction model comprising a recurrent neural network (RNN) model.

13. The method of claim 8, wherein the plurality of respective raw attributes comprise at least one of industry identification data, a transaction amount, a transaction date, transaction location data, a transaction mode, an authentication mode, user account data, client device data, or network connectivity data.

14. The method of claim 8, further comprising determining that a fraud prediction score is based at least in part on an output of the prediction model, the pending transaction being authorized based at least in part on fraud prediction score.

15. A non-transitory computer-readable medium embodying a program executable by at least one processor, wherein the program, when executed, causes the at least one processor at least:

obtain data (1) from a data store comprising historical transaction data and (2) from a terminal application comprising pending transaction data for a pending transaction associated with a user account;

reformat the data into a simplified format that complies with at least one feature criterion of a prediction model of a recurrent neural network prediction-based framework comprising at least one graphics processing unit (GPU), the data being reformatted by causing the at least one processor to at least:

extract a plurality of respective raw attributes from the data;

generate a plurality of interaction features comprising reformatted versions of the plurality of respective raw attributes associated with a pending transaction feature and at least one historical transaction feature; and generate a time-series feature vector comprising the plurality of interaction features, the time-series feature vector including an array of values corresponding to a predetermined number of sequential events;

apply the time-series feature vector as an input to the prediction model that is executed using the at least one GPU of the recurrent neural network prediction-based framework, the prediction model being trained to identify patterns in raw time-series data represented by the time-series feature vector; and authorize the pending transaction based at least in part on an output of the prediction model, wherein the output provides a probability that the pending transaction is fraudulent based at least in part on the data.

16. The non-transitory computer readable medium of claim 15, wherein reformatting the data further comprises generating a first interaction feature of the plurality of interaction features by combining a first respective raw attribute value of a first respective raw attribute of the plurality of respective raw attributes and a second respective raw attribute value of a second respective raw attribute of the plurality of respective raw attributes.

17. The non-transitory computer readable medium of claim 16, wherein the first respective raw attribute corresponds to a respective industry code associated with a respective transaction and the second respective raw attribute corresponds to a respective transaction amount associated with the respective transaction.

18. The non-transitory computer readable medium of claim 17, wherein, when executed, the program further causes the at least one processor to at least assign an amount identifier of a plurality of amount identifiers to the respective transaction amount based at least in part on a value of the respective transaction amount, and an individual amount identifier of the plurality of amount identifiers corresponding to a plurality of different transaction amount ranges.

19. The non-transitory computer readable medium of claim 15, wherein the prediction model comprises a first prediction model and a second prediction model, the first prediction model comprising a recurrent neural network (RNN) model.

20. The non-transitory computer readable medium of claim 15, wherein the plurality of respective raw attributes comprise at least one of industry identification data, a transaction amount, a transaction date, transaction location data, a transaction mode, an authentication mode, user account data, client device data, or network connectivity data.

* * * * *